UNITED STATES PATENT OFFICE.

BRAXTON DAVENPORT AVIS, JR., OF CLARKSBURG, WEST VIRGINIA.

PROCESS OF AND COMPOSITION FOR COATING ALUMINUM OR ITS ALLOYS FOR SOLDERING, &c.

1,029,522.

Specification of Letters Patent.

Patented June 11, 1912.

No Drawing. Application filed February 27, 1912. Serial No. 680,368.

*To all whom it may concern:*

Be it known that I, BRAXTON DAVENPORT AVIS, Jr., a citizen of the United States, residing at Clarksburg, in the county of Harrison, State of West Virginia, have invented a new and useful Improvement in Processes of and Compositions for Coating Aluminum or Its Alloys for Soldering, &c., of which the following is a specification.

This invention relates to the process of soldering aluminum, or its alloys, and has for its object to render the process more expeditious and cheaper.

I have made the discovery that stannous chlorid ($SnCl_2 2H_2O$) which is a powerful reducing agent, having a strong attraction both for oxygen and chlorin, when brought in contact with metallic aluminum and heated below redness, fluxes or dissolves the oxid of aluminum which is always present on the surface of aluminum and is itself partially reduced to metallic tin which is deposited on the aluminum as a strong coherent film.

Heretofore, the soldering of aluminum has been accomplished by depending on special solders containing a certain per cent. of tin, usually in the form of phosphor tin, and when used the parts to be soldered require hard rubbing either with the solder or with a soldering tool or metal brush in order to make the solder adhere. This preliminary work is disadvantageous to the rapid and uniform production of solid joints.

By my process I first tin the surface of the aluminum by applying the stannous chlorid as hereinafter described.

While I may use the stannous chlorid alone, I have found it desirable to combine with it certain other ingredients to make a paste or compound, which is easily applied to the surface to be tinned. To make this paste or compound, I proceed as follows: To from two to three parts of stannous chlorid by weight, I add one part of chlorid of zinc (I do not limit myself to these exact proportions as they may be varied without affecting the general result) the chlorid of zinc being added for the purpose of rendering the mass pasty, as a diluent, and also as tending to prevent the oxidization of the tin after it is deposited on the aluminum surface. This mixture is next heated until the mass becomes liquefied and excess of hydrochloric acid is expelled. On cooling this assumes a pasty form, and I now add a small quantity of powdered metallic tin. This is for the purpose of neutralizing any acid present, and to prevent the stannous chlorid changing into stannic chlorid ($SnCl_4$) through action of moisture and atmospheric oxidation, also this small addition of powdered tin seems to facilitate the deposition of tin on the aluminum surface.

It is evident that any or all of the above ingredients, save the stannous chlorid, may be omitted with the consequent omission of the function or functions of the omitted ingredient or ingredients, as above referred to.

When using stannous chlorid alone or mixed with comminuted tin, it is desirable to heat it until the moisture and excess of hydrochloric acid is expelled; on cooling it becomes solidified and may then be powdered for use alone, or mixed with comminuted tin.

To tin the surface of the aluminum I now apply this paste or compound to the parts I desire to solder and subject it to a heat somewhat below redness. This can be accomplished by merely holding the parts in the flame of a Bunsen lamp or when the parts are large, to use a blow pipe and direct the flame on the parts to be soldered. When the proper temperature is reached the aluminum becomes coated with an oxid of tin and zinc. When this coating is removed by a suitable instrument or brush, the aluminum surface is found to be coated underneath with a bright film of tin. The oxid should be removed while the aluminum is still hot and the tin in a melted condition. From this point on, the soldering of aluminum becomes as simple as that of tin, and two surfaces of aluminum previously tinned as above described, can be joined together, no especial solder being required. Any solder can be used that can be used on a tin surface, also aluminum surfaces so coated may be joined to other metallic surfaces with the proper solder and flux. The chlorid of zinc acts as a flux to remove the oxid of aluminum coating, thus leaving a large portion of the stannous chlorid to combine with the aluminum surface and deposit thereon a coating of tin thereby obviating the necessity of the extra step of tinning where other than a stannous compound is used in coating the aluminum. Again, where two surfaces of aluminum are to be joined together which can not be rubbed with solder or a soldering tool, such as two flat surfaces, by first giving both a preliminary coating of tin by my process, I can then solder them by using any suitable solder and flux. When the solder is used with the proper flux on such a tinned surface, the solder flows evenly, and seems to form a more perfect joint. Surfaces of aluminum can be first prepared by this method for soldering, and then soldered at any time afterward.

Wherever I refer to aluminum, I desire it to be understood that alloys of aluminum are thereby included, as the process is as well adapted for use with aluminum alloys as with aluminum alone.

While I preferably use my process for preparing aluminum or its alloys for soldering, I may coat for any other purposes where a tin surface is requisite upon such body.

Having described my process I now claim, as new, and desire Letters Patent on:

1. The process of coating aluminum with tin comprising the steps of applying to the aluminum surface stannous chlorid and heating until a coating of tin is formed upon such surface, substantially as described.

2. The process of coating aluminum with tin comprising the steps of applying to the aluminum surface a mixture containing stannous chlorid, zinc chlorid and comminuted tin and heating until a coating of tin is formed upon such surface, substantially as described.

3. The process of preparing aluminum articles for subsequent union by soldering, comprising the steps of coating with tin those surfaces which are to be soldered, by applying thereto a substance containing stannous chlorid and heating until a coating of tin is formed upon such surfaces, substantially as described.

4. The process of preparing aluminum articles for subsequent union by soldering, comprising the steps of applying to those surfaces which are to be soldered, a non-oxygenous salt of tin which when heated in contact with a surface of aluminum or superficially oxidized aluminum, produces upon such surface a coating of tin and heating until a coating of tin is formed upon such surfaces, substantially as described.

5. A composition of matter for coating aluminum with tin, comprising stannous chlorid, zinc chlorid and comminuted tin, substantially as described.

6. A composition for coating aluminum with tin consisting of stannous chlorid, zinc chlorid and comminuted tin in the form of a paste, substantially as described.

7. A composition of matter for coating aluminum with tin comprising stannous chlorid and comminuted tin, substantially as described.

8. A composition of matter for coating aluminum with tin comprising stannous chlorid, and an agent for facilitating the deposition of tin therefrom substantially as described.

BRAXTON DAVENPORT AVIS, JR.

Witnesses:
N. H. LEACHMAN,
CHAS. D. STURM.